United States Patent
Tang et al.

(10) Patent No.: US 12,411,523 B2
(45) Date of Patent: Sep. 9, 2025

(54) FOLDABLE ELECTRONIC DEVICE

(71) Applicant: Huawei Technologies Co., Ltd., Shenzhen (CN)

(72) Inventors: Feng Tang, Shenzhen (CN); Yu Liu, Shanghai (CN); Chong Xing, Xi'an (CN); Dede Jiang, Shanghai (CN); Zheng Li, Shanghai (CN); Linhui Niu, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 18/042,076

(22) PCT Filed: Jul. 28, 2021

(86) PCT No.: PCT/CN2021/108823
§ 371 (c)(1),
(2) Date: Feb. 17, 2023

(87) PCT Pub. No.: WO2022/037375
PCT Pub. Date: Feb. 24, 2022

(65) Prior Publication Data
US 2024/0015236 A1    Jan. 11, 2024

(30) Foreign Application Priority Data
Aug. 17, 2020   (CN) .......................... 202010826018.2

(51) Int. Cl.
*H04M 1/02* (2006.01)
*G06F 1/16* (2006.01)

(52) U.S. Cl.
CPC .......... *G06F 1/1652* (2013.01); *G06F 1/1641* (2013.01); *H04M 1/0216* (2013.01); *H04M 1/0268* (2013.01)

(58) Field of Classification Search
CPC .... G06F 1/1652; G06F 1/1641; G06F 1/1637; G06F 1/1681; G06F 1/1626;
(Continued)

(56) References Cited

U.S. PATENT DOCUMENTS 10,976,775 B1 *  4/2021  Cha ...................... H05K 7/1401
2020/0267244 A1 *  8/2020  Kim ...................... G06F 1/1641
(Continued)

FOREIGN PATENT DOCUMENTS

CN    207200775 U    4/2018
CN    109669513 A    4/2019
(Continued)

Primary Examiner — Tanmay K Shah
(74) Attorney, Agent, or Firm — Conley Rose, P.C.

(57) ABSTRACT

A foldable electronic device includes a first main body, a second main body, a rotating shaft assembly, a flexible screen, and a protective bracket. The first main body and the second main body are coupled through the rotating shaft assembly, the flexible screen is disposed on the first main body and the second main body, and the first main body and the second main body rotate relative to the rotating shaft assembly towards a side having the flexible screen. The flexible screen includes a bending region, and a first non-bending region and a second non-bending region that are respectively located on two sides of the bending region. The protection bracket includes a flexible part, a first metal part, and a second metal part. The flexible part is disposed on the flexible screen and includes a main body segment, a first connection segment, and a second connection segment.

20 Claims, 13 Drawing Sheets

(58) Field of Classification Search
CPC ............. H04M 1/0216; H04M 1/0268; H04M 1/0214; G09F 9/301
USPC ..................................................... 455/575.3
See application file for complete search history.

(56) References Cited

U.S. PATENT DOCUMENTS

| | | | |
|---|---|---|---|
| 2020/0352044 A1* | 11/2020 | Hsu | H05K 5/0247 |
| 2021/0044683 A1* | 2/2021 | He | G06F 1/1652 |
| 2021/0116969 A1* | 4/2021 | Yu | G06F 1/1652 |
| 2023/0032983 A1* | 2/2023 | Feng | H04M 1/022 |
| 2023/0074489 A1* | 3/2023 | Sun | G06F 1/203 |

FOREIGN PATENT DOCUMENTS

| | | | | |
|---|---|---|---|---|
| CN | 210183377 U | | 3/2020 | |
| CN | 111477115 A | | 7/2020 | |
| CN | 111503453 A | | 8/2020 | |
| CN | 112584603 A | * | 3/2021 | |
| CN | 111477115 B | * | 10/2022 | ............. G09F 9/301 |
| EP | 3264732 A1 | | 1/2018 | |

\* cited by examiner

FOLDABLE ELECTRONIC DEVICE

CROSS-REFERENCE TO RELATED APPLICATIONS

This is a U.S. National Stage of International Patent Application No. PCT/CN2021/108823 filed on Jul. 28, 2021, which claims priority to Chinese Patent Application No. 202010826018.2 filed on Aug. 17, 2020. Both of the aforementioned applications are hereby incorporated by reference in their entireties.

TECHNICAL FIELD

This application relates to the field of electronic device technologies, and in particular, to a foldable electronic device.

BACKGROUND

With continuous improvement of people's living standards, increasingly more attention is paid to a screen display effect of an electronic device such as a mobile phone. To achieve a relatively large screen area on a relatively small-sized electronic device, the electronic device may use a foldable structure. A foldable electronic device may have two main bodies, the two main bodies can relatively rotate around a rotating shaft and be folded, and a flexible screen simultaneously covers surfaces of the two main bodies. When the two main bodies rotate around the rotating shaft, the flexible screen located above the rotating shaft is bent and is prone to be damaged and failed, which affects user experience.

SUMMARY

Embodiments of this application provide a foldable electronic device, to protect a bending region of a flexible screen.

The embodiments of this application provide a foldable electronic device, including a first main body, a second main body, a rotating shaft assembly, a flexible screen, and a protective bracket.

The first main body and the second main body are connected through the rotating shaft assembly, the flexible screen is disposed on the first main body and the second main body, the first main body and the second main body can rotate relative to the rotating shaft assembly toward a side having the flexible screen, and the flexible screen includes a bending region and a first non-bending region and a second non-bending region that are respectively located on two sides of the bending region.

The protective bracket includes a flexible part, a first metal part, and a second metal part. The flexible part is disposed on the flexible screen, and the flexible part includes a main body segment corresponding to the bending region, a first connection segment corresponding to the first non-bending region, and a second connection segment corresponding to the second non-bending region. One end of the first metal part is embedded in the first connection segment, and the other end is fixedly connected to a bezel of the first main body. One end of the second metal part is embedded in the second connection segment, and the other end is fixedly connected to a bezel of the second main body.

The embodiments of this application provide a foldable electronic device in which a protective bracket for protecting a bending region of a flexible screen is disposed. The protective bracket includes a flexible part and a metal part. The flexible part is connected in the bending region of the flexible screen and can be bent along with bending of the flexible screen, to protect the flexible screen. Two ends of the flexible part are respectively fixedly connected to a first main body and a second main body through the metal part, and a part of the metal part is embedded in the flexible part, so that structural strength of the protective bracket can be improved. In addition, a thickness of the flexible part is relatively small, which can reduce impact on a thickness of the entire foldable electronic device.

In a possible implementation, the first metal part includes a first metal sheet and a second metal sheet that are disposed at an included angle, and the bezel of the first main body is provided with a first mounting groove. The first metal sheet is embedded in the first connection segment, and the second metal sheet extends into and is fastened in the first mounting groove. The second metal part includes a third metal sheet and a fourth metal sheet that are disposed at an included angle, and the bezel of the second main body is provided with a second mounting groove. The third metal sheet is embedded in the second connection segment, and the fourth metal sheet extends into and is fastened in the second mounting groove.

One end of the metal part is embedded in the flexible part, and the other end is fastened in the mounting groove on the bezel, so that the two ends of the flexible part can be fastened on a first housing or a second housing while structural strength of the flexible part is improved. Therefore, when the electronic device is bent, two ends of the protective bracket are reliably fastened.

In a possible implementation, the protective bracket further includes a first rigid part and a second rigid part. An end that is of the second metal sheet and that is away from the first metal sheet is embedded in the first rigid part, and the first rigid part is adhered in the first mounting groove. An end that is of the fourth metal sheet and that is away from the third metal sheet is embedded in the second rigid part, and the second rigid part is adhered in the second mounting groove.

Metal sheets at the two ends of the protective bracket are respectively embedded in two rigid parts, and the rigid parts may be disposed as hard plastic, so that overall structural strength of the protective bracket can be improved. In addition, disposing of the rigid parts facilitate reliable connection to the mounting grooves on the bezels of the main bodies.

In a possible implementation, there are two protective brackets, and the two protective brackets are respectively disposed at two ends of the rotating shaft assembly.

The bending region of the flexible screen is disposed corresponding to the rotating shaft assembly, and the protective bracket is disposed at each of corresponding locations at the two ends of the rotating shaft assembly, that is, the protective bracket is disposed at each of two edges of the bending region, so that the flexible screen can be more comprehensively protected.

In a possible implementation, the flexible part is a soft rubber strip, and the first metal part and the second metal part are stainless steel metal sheets.

The flexible part is disposed as the soft rubber strip to ensure that the flexible part can be bent along with bending of the bending region, and the metal part is disposed as the stainless steel sheet metal, so that structural strength of the protective bracket can be improved.

In a possible implementation, the protective bracket is integrally formed through in-mold injection molding.

This disposing has a simple process, and the protective bracket has high structural strength and a long service life, so that the flexible screen can be better protected.

In a possible implementation, the flexible part is disposed in a non-display region at an edge of the flexible screen.

The flexible part is disposed in the non-display region at the edge of the flexible screen to protect the flexible screen without affecting a display area of the flexible screen.

In a possible implementation, the main body segment, the first connection segment, and the second connection segment of the flexible part each have a thickness of 0.3 mm to 0.5 mm.

The main body segment, the first connection segment, and the second connection segment of the flexible part are disposed protruding from a surface of the flexible screen, and are disposed to have a relatively small thickness, to implement a light and thin design of the foldable electronic device.

In a possible implementation, the electronic device further includes a first protective strip and a second protective strip. The first protective strip is adhered in the first non-bending region and is fixedly connected to the bezel of the first main body, and the second protective strip is adhered in the second non-bending region and is fixedly connected to the bezel of the second main body.

The first protective strip and the second protective strip fasten edges of the flexible screen, to prevent the edges of the flexible screen from being warped or worn. In addition, when the electronic device falls or cracks, the first protective strip and the second protective strip can play a protective role. In another aspect, the first protective strip and the second protective strip are disposed protruding from the surface of the flexible screen, so that when the flexible screen of the electronic device is placed downward on a table top, the first protective strip and the second protective strip are in contact with the table top, to prevent the surface of the flexible screen from being scratched.

In a possible implementation, the bezels of the first main body and the second main body are respectively provided with a first stepped surface and a second stepped surface. The first stepped surface is lower than an upper surface of the first main body, the second stepped surface is lower than an upper surface of the second main body, and the flexible screen is adhered on the upper surfaces of the first main body and the second main body. The first protective strip includes a first planar-surface portion and a first arc-surface portion, and the second protective strip includes a second planar-surface portion and a second arc-surface portion. The first planar-surface portion is adhered in the first non-bending region of the flexible screen, and the second planar-surface portion is adhered in the second non-bending region of the flexible screen. The first arc-surface portion is adhered on the first stepped surface, and the second arc-surface portion is adhered on the second stepped surface.

A relatively low stepped surface is disposed on the bezel of the main body, which helps fasten the protective strip. The protective strip is provided with a planar-surface portion and an arc-surface portion, where the arc-surface portion is configured to implement fastening with the bezel of the main body, and the planar-surface portion is connected to the flexible screen, so that while the protective strip protects the flexible screen, only the planar-surface portion protrudes from the upper surface of the flexible screen, which has relatively small impact on the thickness of the entire electronic device.

In a possible implementation, the first arc-surface portion includes a first shielding segment, and the second arc-surface portion includes a second shielding segment. The first shielding segment and the second shielding segment are opposite to the flexible part in length directions of the first stepped surface and the second stepped surface.

The shielding segment on the protective strip is disposed corresponding to the protective bracket to play a shielding function, so that mounting structures of the protective bracket and the bezel cannot be easily visible to a user's field of view, thereby helping improve an aesthetic property of appearance of the electronic device.

In a possible implementation, the first protective strip and the second protective strip are integrally formed hard plastic members.

Both the first protective strip and the second protective strip are disposed as materials such as hard plastic, so that the first protective strip and the second protective strip have high structural strength and are not prone to be worn.

In a possible implementation, the rotating shaft assembly includes a rotating shaft body, a rotating shaft housing, a first mechanical part, and a second mechanical part. The first mechanical part and the second mechanical part are connected through the rotating shaft body and can rotate relative to the rotating shaft body. The first mechanical part and the second mechanical part are respectively fixedly connected to the first main body and the second main body. The first main body and the second main body are respectively provided with a first accommodating cavity and a second accommodating cavity, and the rotating shaft assembly is disposed in the first accommodating cavity and the second accommodating cavity. When the electronic device is in an unfolded state, upper surfaces of the first main body, the second main body, the first mechanical part, the second mechanical part, and the rotating shaft body are located on a same plane.

The rotating shaft assembly is fixedly connected to the first main body and the second main body through the first mechanical part and the second mechanical part, so that when the first mechanical part and the second mechanical part in the rotating shaft assembly rotate relative to the rotating shaft body, the first main body and the second main body can be driven to rotate relative to the rotating shaft assembly. The rotating shaft assembly is disposed in the accommodating cavity, so that when the electronic device is in an unfolded state, the surface of the flexible screen is smooth, thereby ensuring a display effect and an aesthetic property of appearance.

According to the foldable electronic device provided in the embodiments of this application, a protective bracket for protecting a bending region of a flexible screen is provided, and the protective bracket includes a flexible part and a metal part. The flexible part is connected in the bending region of the flexible screen and can be bent along with bending of the flexible screen, to protect the flexible screen. Two ends of the flexible part are respectively fixedly connected to a first main body and a second main body through the metal part, and a part of the metal part is embedded in the flexible part, so that a thickness of the flexible part is relatively small while structural strength of the protective bracket can be improved, thereby facilitating a light and thin design of the entire foldable electronic device.

DESCRIPTIONS OF REFERENCE NUMERALS

100—foldable electronic device; 11a—first main body; 11b—second main body; 111a—first accommodating cavity; 111b—second accommodating cavity; 112a—first mounting groove; 112b—second mounting groove; 113a—first stepped surface; 113b—second stepped surface; 12—flexible screen; 12a—first non-bending region; 12b—second non-bending region; 12c—bending region; 13a—first protective strip; 13b—second protective strip; 131a—first planar-surface portion; 131b—second planar-surface portion; 132a—first arc-surface portion; 132b—second arc-surface portion; 1321a—first shielding segment; 1321b—second shielding segment; 14—protective bracket; 141—flexible part; 1411—main body segment; 1412a—first connection segment; 1412b—second connection segment; 1413—abutment portion; 1414—extending portion; 142a—first metal part; 1421—first connection plate; 1422—second connection plate; 142b—second metal part; 1423—third connection plate; 1424—fourth connection plate; 143a—first rigid part; 143b—second rigid part; 15—rotating shaft assembly; 151—rotating shaft body; 152—rotating shaft housing; 153—first mechanical part; and 154—second mechanical part.

DESCRIPTION OF EMBODIMENTS

Embodiments of this application provide a foldable electronic device, including but not limited to a terminal device that has a display screen, such as a mobile phone, a tablet computer, a notebook computer, a display, or an in-vehicle apparatus. A specific form of the foldable electronic device is not specifically limited in the embodiments of this application. The foldable electronic device implements bending and folding of a screen by using a flexible screen, so that the flexible screen has a relatively large display area while the electronic device has a relatively compact volume. The foldable electronic device may be folded once, twice, or more times. For ease of understanding, a specific structure of the foldable electronic device is specifically described in the embodiments of this application by using a foldable mobile phone that is folded once.

It should be noted that in the accompanying drawings in the embodiments of this application, an X axis may be defined as a length direction of an electronic device 100, a Y axis may be defined as a width direction of the electronic device 100, and a Z axis may be defined as a thickness direction of the electronic device 100. More specifically, a positive direction of the X axis may be defined as a direction from left to right on a display surface when the electronic device 100 is in an unfolded state for use, a positive direction of the Y axis may be defined as a direction from bottom to top on the display surface when the electronic device 100 is in normal use, and a positive direction of the Z axis may be defined as a direction pointing from the back of the electronic device 100 to the display surface when the electronic device 100 is in an unfolded state.

Figure 1:
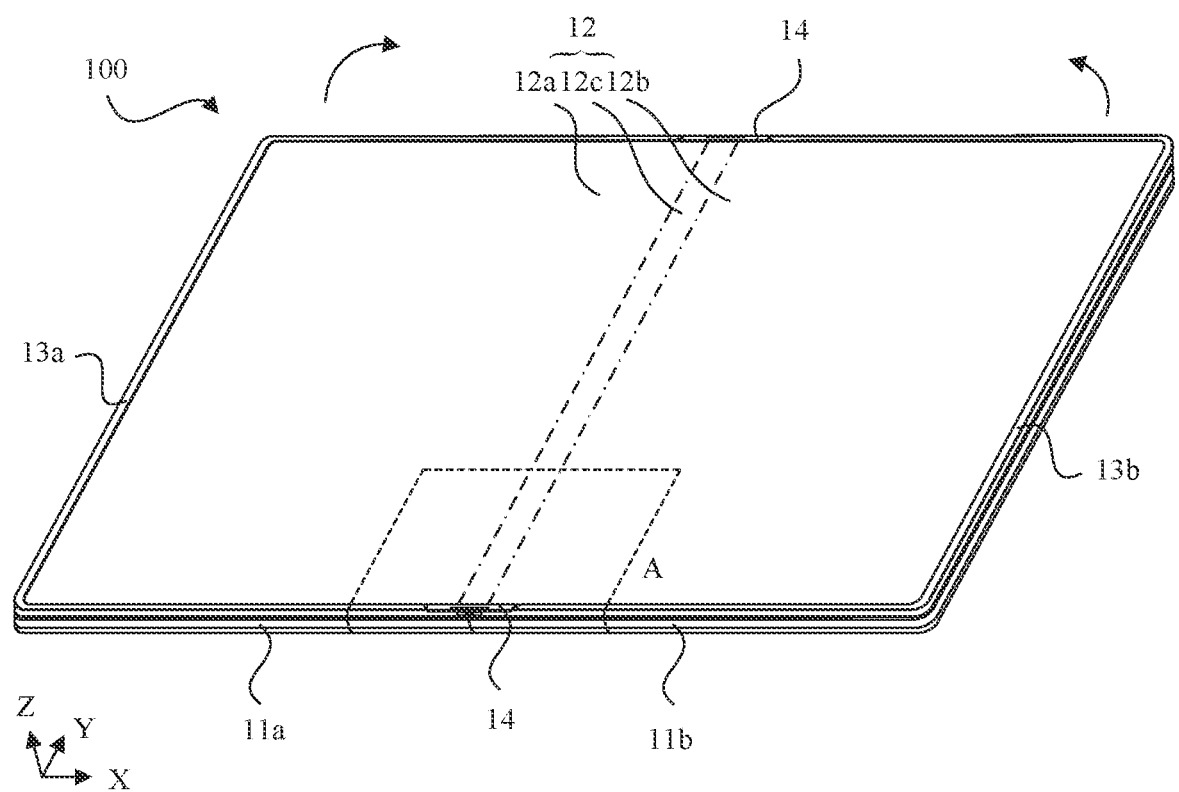
FIG. 1 is a schematic diagram of a structure of an electronic device according to an embodiment of this application.

FIG. 1 is a schematic diagram of an overall structure of a foldable electronic device according to an embodiment of this application. As shown in FIG. 1, the foldable electronic device 100 includes a first main body 11a, a second main body 11b, and a flexible screen 12. The flexible screen 12 is disposed on the first main body 11a and the second main body 11b. The first main body 11a and the second main body 11b can rotate around a rotating shaft between the first main body 11a and the second main body 11b, so that ends that are of the first main body 11a and the second main body 11b and that are away from the rotating shaft are relatively close to each other or relatively far away from each other. The flexible screen 12 can be bent or unfolded correspondingly as locations of the first main body 11a and the second main body 11b change, so that the electronic device 100 is in an unfolded state, a bent state, or folded state as a whole.

In this embodiment of this application, the foldable electronic device 100 uses a foldable structure folded to the inside. To be specific, the electronic device 100 is folded toward a side having the flexible screen 12, at least one of the first main body 11a and the second main body 11b rotates based on a direction pointed by an arrow in FIG. 1, and the flexible screen 12 is located inside the electronic device 100 after the main body is folded, so that the flexible screen 12 is prevented from being exposed to the outside to be worn, scratched, and the like. When the electronic device 100 is in an unfolded state, the first main body 11a and the second main body 11b are disposed side by side and in a coplanar manner, and flexible screens 12 covering the first main body 11a and the second main body 11b are on one display surface, and can perform displaying as a single complete display screen.

The flexible screen 12 is configured to display an image, and may be an organic light emitting diode (organic light emitting diode, OLED) display screen. The OLED display screen is a self-luminous display screen, and a laminated structure of the OLED display screen may include a substrate base plate, a display panel, a polarizing plate, a cover plate, an optically clear adhesive, and the like, and is bendable. A touch panel may further be disposed inside the flexible screen 12, so that the flexible screen 12 has both a touch function and a control function.

Implementation forms of the first main body 11a and the second main body 11b may include structures such as a middle bezel, a rear housing, a middle plate, and the like of the electronic device 100. The first main body 11a and the second main body 11b may use structures such as metal, plastic, ceramic, and glass, and have relatively high structural strength to support the flexible screen 12. The flexible screen 12 may be specifically connected to the first main body 11a and the second main body 11b through an adhesive or the like. The first main body 11a and the second main body 11b may be further connected to structures such as a main circuit board, a battery, and a photographing module. Details are not further described herein.

A person skilled in the art may understand that the rotating shaft located between the first main body 11a and the second main body 11b may be a physical rotating shaft or may be a virtual rotating shaft. When the rotating shaft is a virtual rotating shaft, the rotating shaft is not entirely composed of physical parts of the electronic device 100, but is a virtual rotating line formed by a shape constraint or a displacement constraint generated during relative movement of different parts.

The flexible screen 12 may be divided into a first non-bending region 12a supported by the first main body 11a, a second non-bending region 12b supported by the second main body 11b, and a bending region 12c (a region between two dash-dot lines in the figure) between the first non-bending region 12a and the second non-bending region 12b. The bending region 12c is disposed corresponding to the rotating shaft. When the first main body 11a and the second main body 11b rotate relative to the rotating shaft, the first non-bending region 12a and the second non-bending region 12b of the flexible screen 12 remain planar, and the bending region 12c is bent. In addition, a smaller included angle between the first main body 11a and the second main body 11b indicates a greater bending degree of the bending region 12c.

The flexible screen 12 is relatively fragile in structure and is extremely prone to be scratched and worn. Particularly, the bending region 12c that needs to be frequently bent is prone to be wrinkled, distorted, and even fragmented. Based on this, the foldable electronic device 100 in this embodiment of this application further includes a first protective strip 13a, a second protective strip 13b, and a protective bracket 14. The first protective strip 13a is disposed on the first main body 11a to protect the first non-bending region 12a of the flexible screen 12, and the second protective strip 13b is disposed on the second main body 11b to protect the second non-bending region 12b of the flexible screen 12. The protective bracket 14 is disposed between the first main body 11a and the second main body 11b to protect the bending region 12c of the flexible screen 12. There may be two protective brackets 14, which are respectively disposed at two ends of the rotating shaft to protect two edge regions of the bending region 12c.

The flexible screen 12 may be divided into a display region and a non-display region located around the display region. The first protective strip 13a, the second protective strip 13b, and the protective bracket 14 are all connected to the non-display region of the flexible screen 12, to jointly protect the flexible screen 12 without affecting a display function of the flexible screen 12.

The first main body 11a and the second main body 11b each may be disposed as a rectangle. The first protective strip 13a is connected to a non-display region of the first non-bending region 12a, and the second protective strip 13b is connected to a non-display region of the second non-bending region 12b. The first protective strip 13a and the second protective strip 13b respectively present structures of words " ⌐." that are disposed symmetrically relative to an axis in which the rotating shaft is located. In addition, the first protective strip 13a is fixedly connected to the first main body 11a, and the second protective strip 13b is fixedly connected to the second main body 11b. For example, the first protective strip 13a may be fixedly connected to the flexible screen 12 and the first main body 11a through an adhesive, and the second protective strip 13b may be fixedly connected to the flexible screen 12 and the second main body 11b through an adhesive. Both the first protective strip 13a and the second protective strip 13b can be disposed as materials such as hard plastic, so that the first protective strip 13a and the second protective strip 13b have high structural strength and are not prone to be worn.

In one aspect, the first protective strip 13a and the second protective strip 13b fasten edges of the flexible screen 12, to prevent the edges of the flexible screen 12 from being warped or worn. In addition, when the electronic device 100 falls or cracks, the first protective strip 13a and the second protective strip 13b can play a protective role. In another aspect, the first protective strip 13a and the second protective strip 13b are disposed protruding from a surface of the flexible screen 12, so that when the flexible screen 12 of the electronic device 100 is placed downward on a table top, the first protective strip 13a and the second protective strip 13b are in contact with the table top, to prevent the surface of the flexible screen 12 from being scratched.

The protective bracket 14 is disposed in a non-display region of the bending region 12c to protect the bending region 12c of the flexible screen 12. The bending region 12c may be a rectangle disposed corresponding to the rotating shaft. A length direction of the bending region 12c is consistent with a length direction of the rotating shaft, and is a width direction of the electronic device 100, that is, a direction of a Y axis in FIG. 1. When the electronic device 100 is bent, an entire length of the bending region 12c is deformed with rotation of the rotating shaft, and edge regions at two ends in the length direction of the bending region 12c are prone to be warped or worn. Therefore, two protective brackets 14 may be disposed, which are respectively disposed at the two ends of the bending region 12c. The protective bracket 14 may be a flexible part such as a soft rubber strip, which may be bent with bending of the bending region 12c of the flexible screen 12, thereby protecting the bending region 12c of the flexible screen 12.

However, if the protective bracket 14 is disposed as only the soft rubber strip, two ends of the soft rubber strip are respectively connected to the first protective strip 13a and the second protective strip 13b. In one aspect, a thickness of the soft rubber strip is relatively large, so that a protective structure protruding from the surface of the flexible screen 12 is relatively large, which affects an overall thickness of the entire electronic device 100. In another aspect, the soft rubber strip has relatively low structural strength and is prone to be deformed after being affected by external force such as repeated bending, and therefore loses a function of protecting the flexible screen 12.

Based on this, the embodiments of this application provide a foldable electronic device in which a protective bracket for protecting a bending region of a flexible screen is disposed. The protective bracket includes a flexible part and a metal part. The flexible part is connected in the bending region of the flexible screen and can be bent along with bending of the flexible screen, to protect the flexible screen. Two ends of the flexible part are respectively fixedly connected to a first main body and a second main body through the metal part, and a part of the metal part is embedded in the flexible part, so that structural strength of the protective bracket can be improved. In addition, a thickness of the flexible part is relatively small, which can reduce impact on a thickness of the entire foldable electronic device.

A structure of the foldable electronic device provided in the embodiments of this application is described in detail below with reference to specific accompanying drawings and embodiments.

Figure 2:
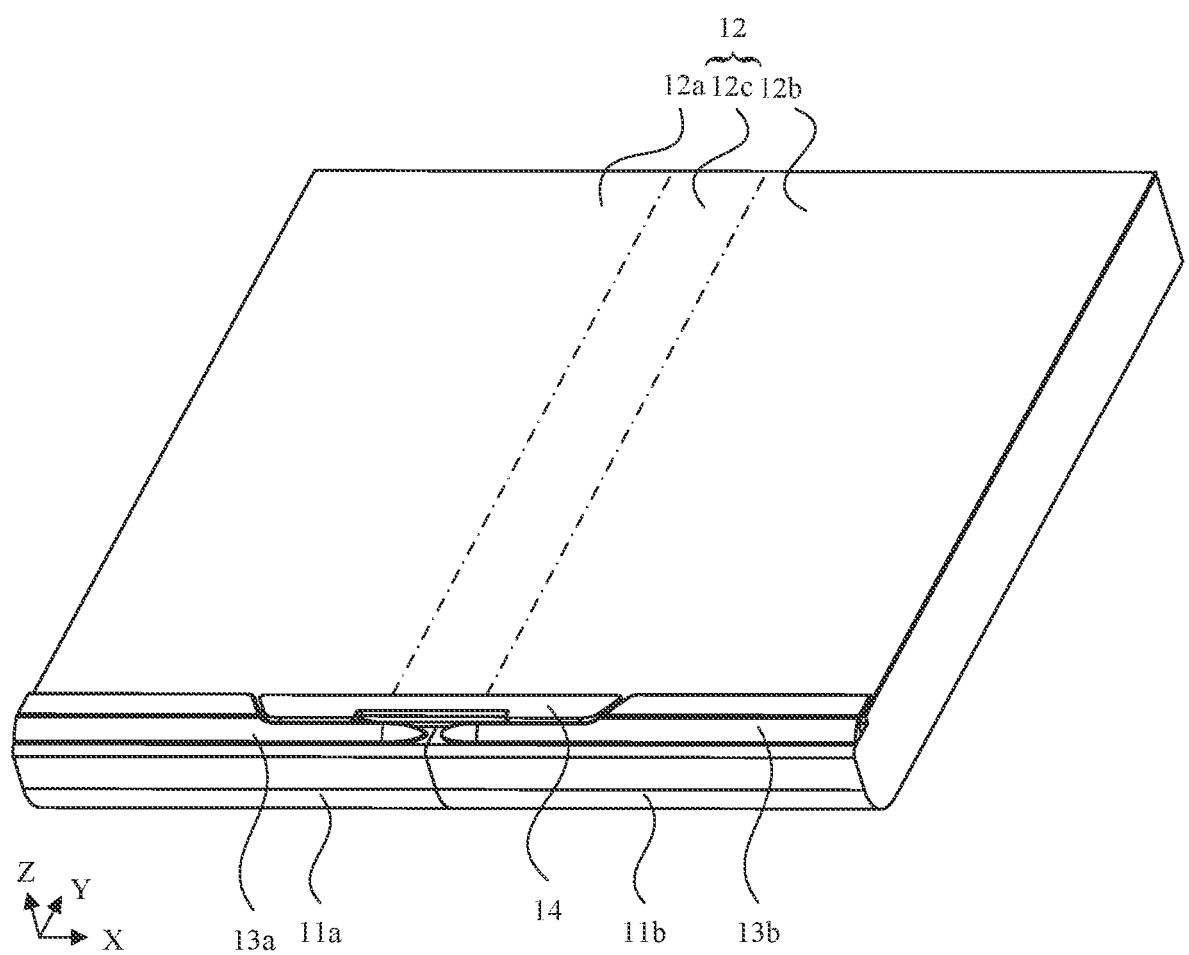
FIG. 2 is a schematic diagram of a partial structure of a foldable electronic device in an unfolded state according to an embodiment of this application.
Figure 3:
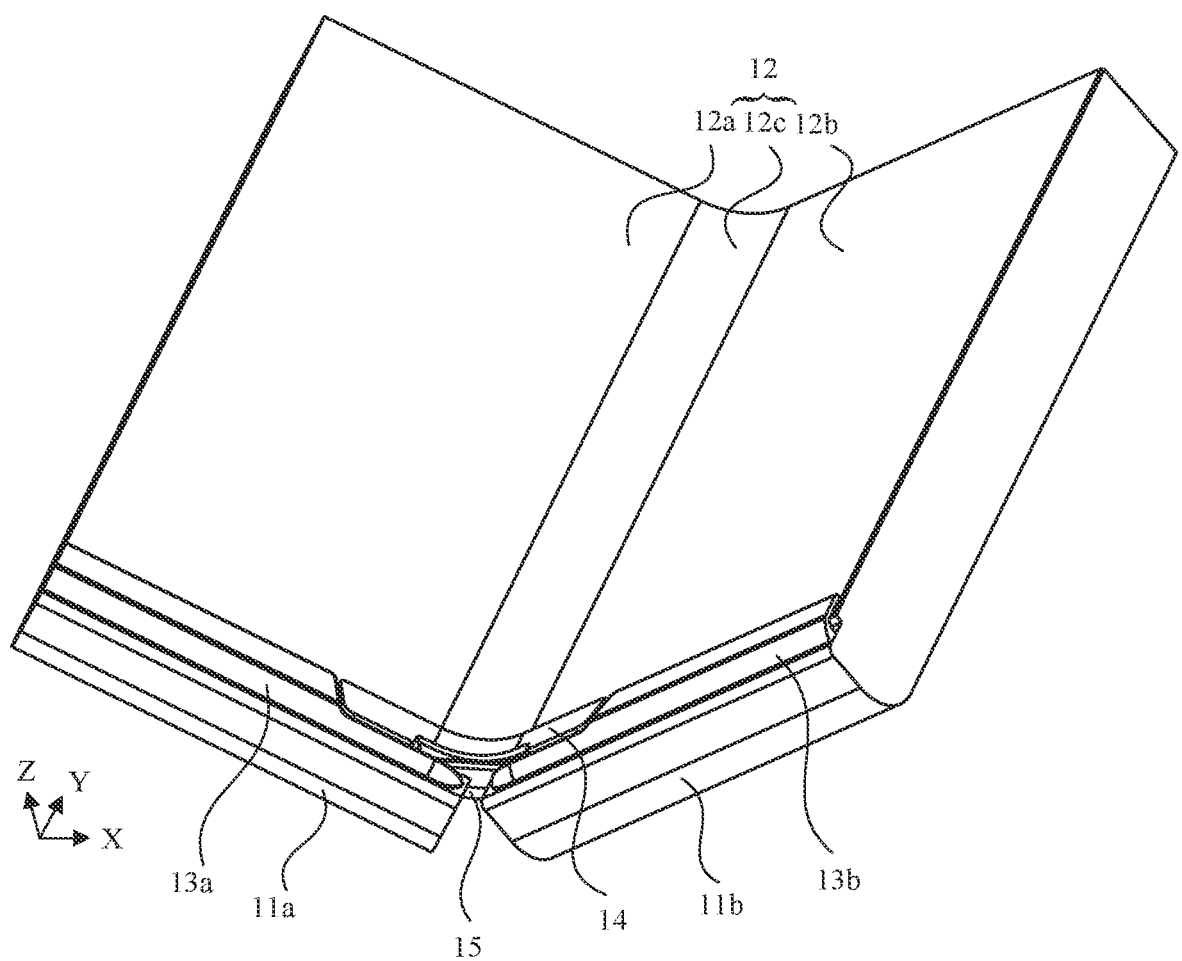
FIG. 3 is a schematic diagram of a partial structure of a foldable electronic device in a bent state according to an embodiment of this application.
Figure 4:
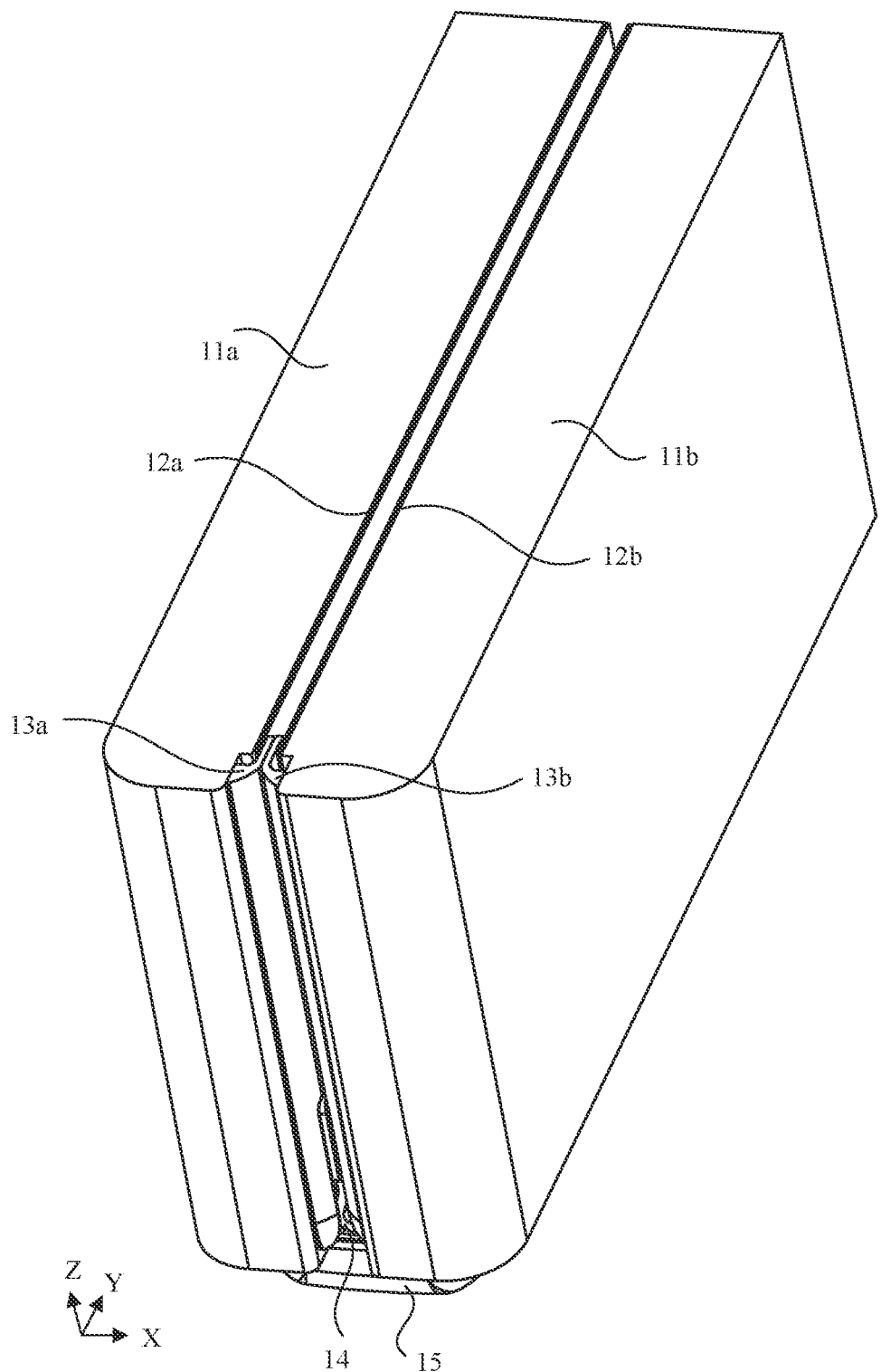
FIG. 4 is a schematic diagram of a partial structure of a foldable electronic device in a folded state according to an embodiment of this application.

FIG. 2 is a schematic diagram of a partial structure of a foldable electronic device in an unfolded state according to an embodiment of this application. FIG. 3 is a schematic diagram of a partial structure of a foldable electronic device in a bent state according to an embodiment of this application. FIG. 4 is a schematic diagram of a partial structure of a foldable electronic device in a folded state according to an embodiment of this application. FIG. 2 to FIG. 4 each correspond to a region A in FIG. 1. As shown in FIG. 2, FIG. 3, and FIG. 4, a physical foldable structure of the foldable electronic device 100 mainly includes the first main body 11a the second main body 11b, and a rotating shaft assembly 15. Ends that are of the first main body 11a and the second main body 11b and that are connected to the rotating shaft assembly 15 serve as hinged ends. Ends that are of the first main body 11a and the second main body 11b and that are away from the rotating shaft assembly 15 serve as free ends. The free ends of the first main body 11a and the second main body 11b can rotate around the rotating shaft assembly 15.

When an included angle between the first main body 11a and the second main body 11b is 180 degrees, the first main body 11a and the second main body 11b are disposed coplanar, the flexible screen 12 is in one plane, and the electronic device 100 is in an unfolded state in FIG. 2. When the included angle between the first main body 11a and the second main body 11b is between 0 degree and 180 degree, an included angle is formed between the first non-bending region 12a and the second non-bending region 12b of the flexible screen 12, the bending region 12c is bent, and the electronic device 100 is in a bent state in FIG. 3. When the included angle between the first main body 11a and the second main body 11b is close to 0 degrees, the first main body 11a and the second main body 11b are approximately attached to each other, the first non-bending region 12a and the second non-bending region 12b of the flexible screen 12 are attached to each other, the bending region 12c has a maximum bending angle, and the electronic device 100 is in a folded state in FIG. 4.

The protective bracket 14 is connected to the non-display region of the flexible screen 12, covers the non-display region of the bending region 12c and extends at two ends to the non-display regions of the first non-folded region 12a and the second non-folded region 12b. When the electronic device 100 is in an unfolded state, the protective bracket 14 is also in an unfolded state, so that the flexible screen 12 remains in a flat state. When the electronic device 100 is in a bent state, the protective bracket 14 is also in a bent state, so that the bending region 12c of the flexible screen 12 and the rotating shaft assembly 15 remain in attachment, and the bending region 12c is connected to the first non-bending region 12a and the second non-bending region 12b on two sides through a smooth transition. When the electronic device 100 is in a folded state, the protective bracket 14 has a maximum bending angle, and two ends of the protective bracket 14 are attached to each other, so that a bending degree of the bending region 12c of the flexible screen 12 can be reduced, and a bend supporting the bending region 12c is deformed to play a protective role.

Figure 5:
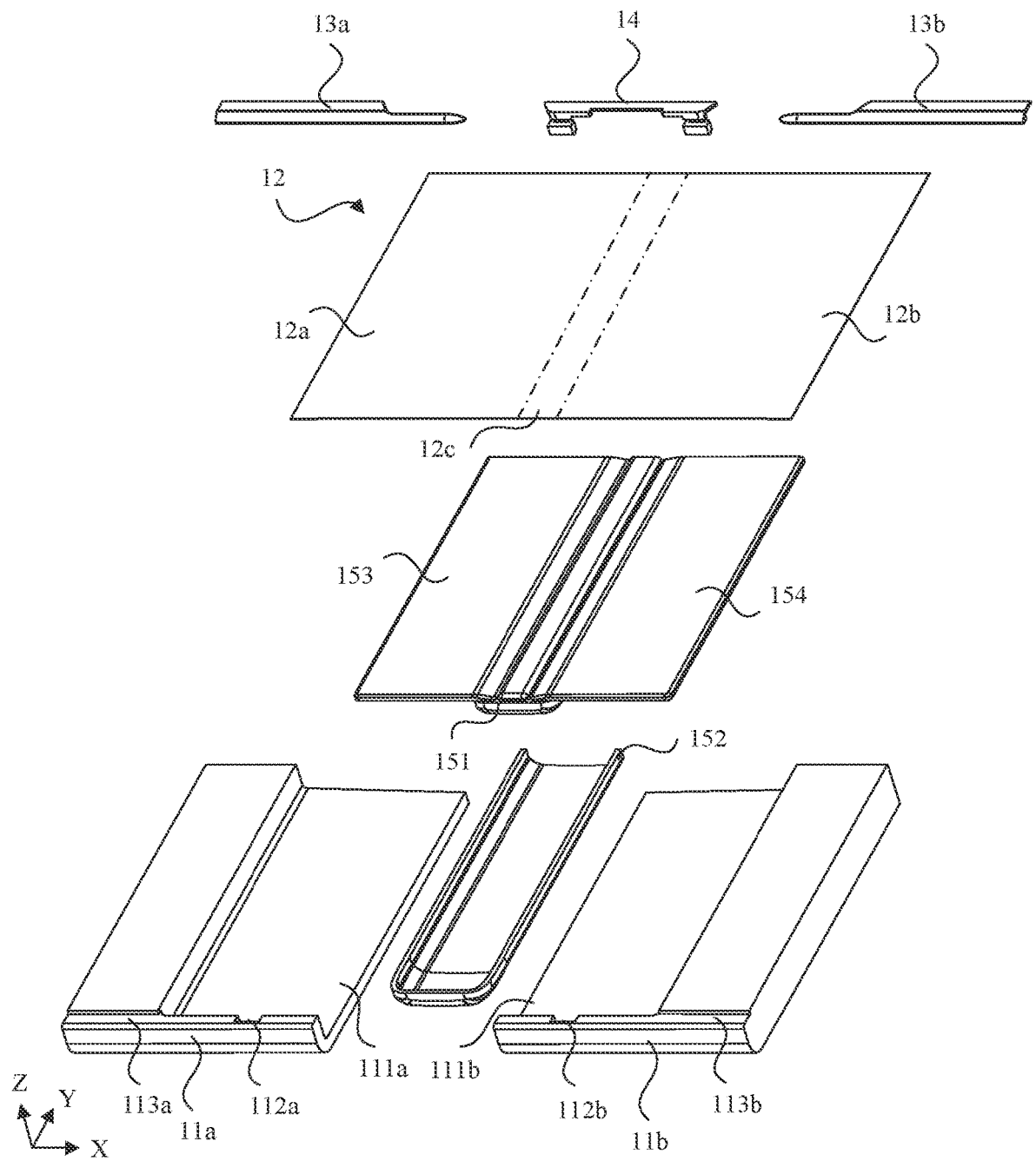
FIG. 5 is a schematic diagram of an exploded structure of a foldable electronic device according to an embodiment of this application.

FIG. 5 is a schematic diagram of an exploded structure of a foldable electronic device according to an embodiment of this application. As shown in FIG. 5, the rotating shaft assembly 15 includes a rotating shaft body 151, a rotating shaft housing 152, a first mechanical part 153, and a second mechanical part 154. The rotating shaft body 151 may specifically include structures such as a hinge. The rotating shaft housing 152 is sleeved on a side that is of the rotating shaft body 151 and that is away from the flexible screen 12. When the electronic device 100 is in a bent state and a folded state, partial appearance of the rotating shaft housing 152 is exposed to a user's field of view. The first mechanical part 153 and the second mechanical part 154 are respectively connected to two sides of the rotating shaft body 151 and can rotate relative to the rotating shaft body 151. The first mechanical part 153 and the second mechanical part 154 may be respectively fixedly connected to the first main body 11a and the second main body 11b through a structure such as a screw, so that the first main body 11a and the second main body 11b can also rotate relative to the rotating shaft body 151.

The first main body 11a and the second main body 11b are respectively provided with a first accommodating cavity 111a and a second accommodating cavity 111b, and the rotating shaft assembly 15 is mounted in the first accommodating cavity 111a and the second accommodating cavity 111b. When the electronic device 100 is in an unfolded state, upper surfaces of the first mechanical part 153, the second mechanical part 154, the first main body 11a, and the second main body 11b are on a same plane to jointly support the flexible screen 12. A lower surface of the flexible screen 12 is adhered to the first mechanical part 153, the second mechanical part 154, the first main body 11a, and the second main body 11b. The bending region 12c of the flexible screen 12 is disposed corresponding to the rotating shaft body 151, and may be adhered to the rotating shaft body 151 through an adhesive. Alternatively, the bending region 12c of the flexible screen 12 is not adhered to the rotating shaft body 151, and unfolding, bending, and folding of the flexible screen 12 can be implemented simply by fastening the first non-bending region 12a and the second non-bending region 12b on the two sides.

Bezels around the first main body 11a and the second main body 11b are respectively provided with a first stepped surface 113a and a second stepped surface 113b. The first stepped surface 113a is located on a side that is of the bezel around the first main body 11a and that faces the outside of the electronic device 100, and is disposed lower than the upper surface of the first main body 11a. The second stepped surface 113b is located on a side that is of the bezel around the second main body 11*b* and that faces the outside of the electronic device 100, and is disposed lower than the upper surface of the second main body 11*b*. The first stepped surface 113*a* and the upper surface of the first main body 11*a* form a step, and the second stepped surface 113*b* and the upper surface of the second main body 11*b* form a step. It is not difficult to understand that the first stepped surface 113*a* and the second stepped surface 113*b* are coplanar.

The first protective strip 13*a* is mounted on the first stepped surface 113*a* of the first main body 11*a*, and the second protective strip 13*b* is mounted on the second stepped surface 113*b* of the second main body 11*b*. The bezels of the first main body 11*a* and the second main body 11*b* are respectively provided with a first mounting groove 112*a* and a second mounting groove 112*b*. The first mounting groove 112*a* may be disposed corresponding to the first non-bending region 11*a*, the second mounting groove 112*b* may be disposed corresponding to the second non-bending region 12*b*, and the first mounting groove 112*a* and the second mounting groove 112*b* both are disposed close to the bending region 12*c*. The two ends of the protective bracket 14 are respectively fixedly connected to the first mounting groove 112*a* and the second mounting groove 112*b*.

Figure 6:
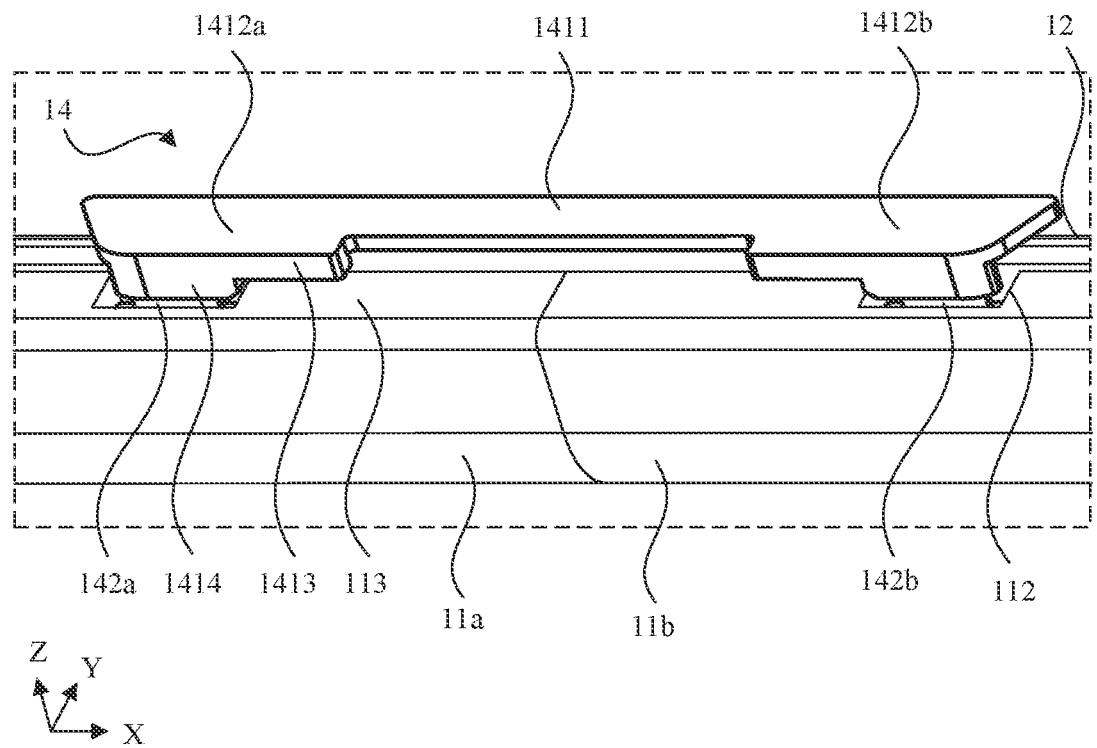
FIG. 6 is a schematic diagram of a structure in which a protective bracket is mounted on a first main body and a second main body according to an embodiment of this application.
Figure 7:
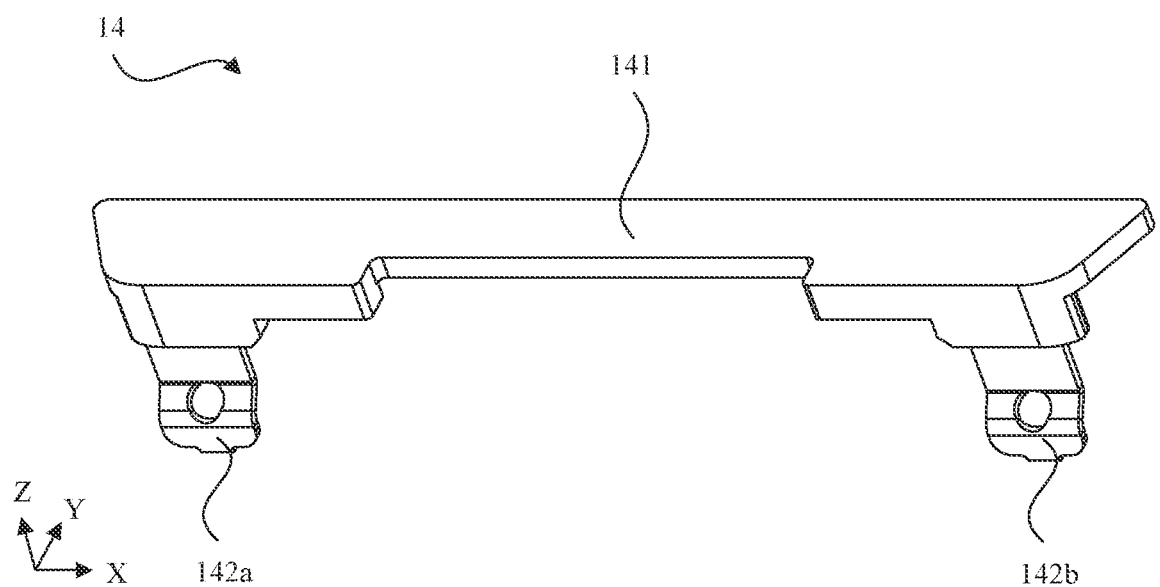
FIG. 7 is a schematic diagram of a structure of a protective bracket according to an embodiment of this application.
Figure 8:
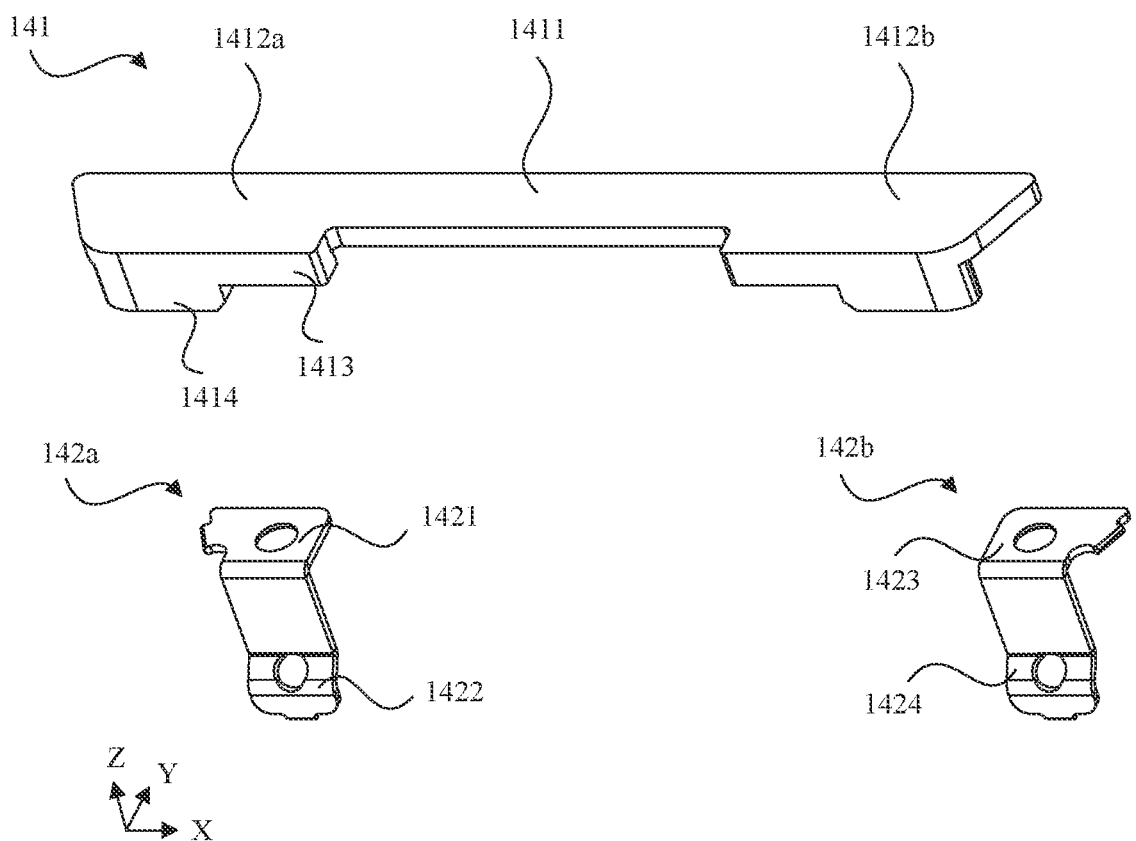
FIG. 8 is a schematic diagram of an exploded structure of the protective bracket provided in FIG. 7.

FIG. 6 is a schematic diagram of a structure in which a protective bracket is mounted on a first main body and a second main body according to an embodiment of this application. FIG. 7 is a schematic diagram of a structure of a protective bracket according to an embodiment of this application. FIG. 8 is a schematic diagram of an exploded structure of the protective bracket provided in FIG. 7. As shown in FIG. 6 to FIG. 8, the protective bracket 14 includes a flexible part 141 and a first metal part 142*a* and a second metal part 142*b* that are fixedly connected to the flexible part 141.

The flexible part 141 is disposed as a long-strip-shaped thin sheet, and a length direction of the flexible part 141 is perpendicular to an axis direction of the rotating shaft assembly 15 and is consistent with a length direction of the electronic device 100. The flexible part 141 may be fixedly connected to an upper surface of the flexible screen 12 through an adhesive. The flexible part 141 is connected to the non-display region at an edge of the bending region 12*c* of the flexible screen 12, and can be bent with bending of the bending region 12*c* to protect the bending region 12*c* of the flexible screen 12.

The flexible part 141 includes a main body segment 1411 and a first connection segment 1412*a* and a second connection segment 1412*b* that are respectively located at two ends in a length direction of the main body segment 1411. A length of the main body segment 1411 is not less than a width of the bending region 12*c* to cover the non-display region of the bending region 12*c*, and the main body segment 1411 can be bent with bending of the bending region 12*c*.

The first connection segment 1412*a* and the second connection segment 1412*b* are respectively connected to the first metal part 142*a* and the second metal part 142*b*, and the first metal part 142*a* and the second metal part 142*b* are connected to a side that is of the flexible part 141 and that faces the outside of the electronic device 100. The first connection segment 1412*a* is disposed in the non-display region at an edge of the first non-bending region 12*a*, and the second connection segment 1412*b* is disposed in the non-display region at an edge of the second non-bending region 12*b* and can be further fastened through adhering. The first metal part 142*a* and the second metal part 142*b* are respectively fastened to the bezels of the first main body 11*a* and the second main body 11*b*, to ensure that the two ends of the protective bracket 14 are reliably fastened during folding of the electronic device 100, and that only the main body segment 1411 of the flexible part 141 is bent.

The first metal part 142*a* includes a first connection plate 1421 and a second connection plate 1422. The first connection plate 1421 is embedded in the first connection segment 1412*a* of the flexible part 141. A plane on which the first connection plate 1421 is located is parallel to a plane on which the flexible part 141 is located, so that the flexible part 141 can have a thickness as small as possible while structural strength of the flexible part 141 is improved. The second connection plate 1422 and the first connection plate 1421 are disposed at an included angle, for example, the included angle between the second connection plate 1422 and the first connection plate 1421 is 90 degrees. The second connection plate 1422 is configured to be connected to the first main body 11*a*, for example, may be fastened to the bezel of the first main body 11*a* through welding, clamping, fastening by a threaded fastener, or bonding. For example, the second connection plate 1422 may be connected in the first mounting groove 112*a* of the bezel of the first main body 11*a* through clamping.

A structure of the second metal part 142*b* and a structure of the first metal part 142*a* may be disposed symmetrically relative to the flexible part 141. The second metal part 142*b* includes a third connection plate 1423 and a fourth connection plate 1424. The third connection plate 1423 is embedded in the second connection segment 1412*b* of the flexible part 141. A plane on which the third connection plate 1423 is located is parallel to a plane on which the flexible part 141 is located, so that the flexible part 141 can have a thickness as small as possible while structural strength of the flexible part 141 is improved. The fourth connection plate 1424 and the third connection plate 1423 are disposed at an included angle, for example, the included angle between the fourth connection plate 1424 and the third connection plate 1423 is 90 degrees. The fourth connection plate 1424 is configured to be connected to the second main body 11*b*, for example, may be fastened to the bezel of the second main body 11*b* through welding, clamping, fastening by a threaded fastener or bonding. For example, the fourth connection plate 1424 may be connected in the second mounting groove 112*b* of the bezel of the second main body 11*b* through clamping.

The flexible part 141 further includes an abutment portion 1413 and an extending portion 1414 that are disposed on a side that is of the first connection segment 1412*a* and that faces the outside of the electronic device 100. A thickness of the abutment portion 1413 is greater than a thickness of the main body segment 1411 and that of the first connection segment 1412*a*. When the main body segment 1411 and the first connection segment 1412*a* are attached to the upper surface of the flexible screen 12, the abutment portion 1413 abuts against the first stepped surface 113*a* on the bezel of the first main body 11*a*. The extending portion 1414 covers a partial length of the second connection plate 1422, so that structural strength at locations at which the first connection plate 1421 and the second connection plate 1422 are connected is higher and appearance is more aesthetic. An abutment portion and an extending portion are also disposed near the second connection segment 1412*b* of the flexible part 141. Details are not described herein.

In a possible implementation, the first connection plate 1421 and the third connection plate 1423 are provided with openings, and the openings can improve strength of bonding between the first metal part 142*a* and the flexible part 141 and between the second metal part 142*b* and the flexible part 141. The second connection plate 1422 and the fourth connection plate 1424 may also be provided with openings, which may be used for implementing clamping or screwing.

The first metal part 142a and the second metal part 142b are integrally formed. The first metal part 142a is bent to form the first connection plate 1421 and the second connection plate 1422, and the second metal part 142b is bent to form the third connection plate 1423 and the fourth connection plate 1424. For example, the first metal part 142a and the second metal part 142b may be made of stainless steel materials. The flexible part 141 may be made of soft rubber. The first metal part 142a, the second metal part 142b, and the flexible part 141 are formed by using an in-mold injection molding process, so that the first connection plate 1421 of the first metal part 142a is embedded in the first connection segment 1412a of the flexible part 141, and the third connection plate 1423 of the second metal part 142b is embedded in the second connection segment 1412b of the flexible part 141, thereby forming an integrated protective bracket 14.

Thicknesses of the first metal part 142a and the second metal part 142b each may be 0.1 mm to 0.3 mm, for example, may be 0.2 mm. The first metal part 142a and the second metal part 142b are small in thickness and high in structural strength, and the first metal part 142a and the second metal part 142b are embedded in the flexible part 141, so that structural strength of the flexible part 141 can be effectively improved, and the protective bracket 14 and the flexible screen 12 can resist a specific degree of damage caused by external force. A thickness of the flexible part 141 is greater than the thickness of the first metal part 142a and that of the second metal part 142b, for example, may be 0.3 mm to 0.5 mm. A relatively thin structure can satisfy a light and thin design of the entire electronic device 100.

Figure 9:
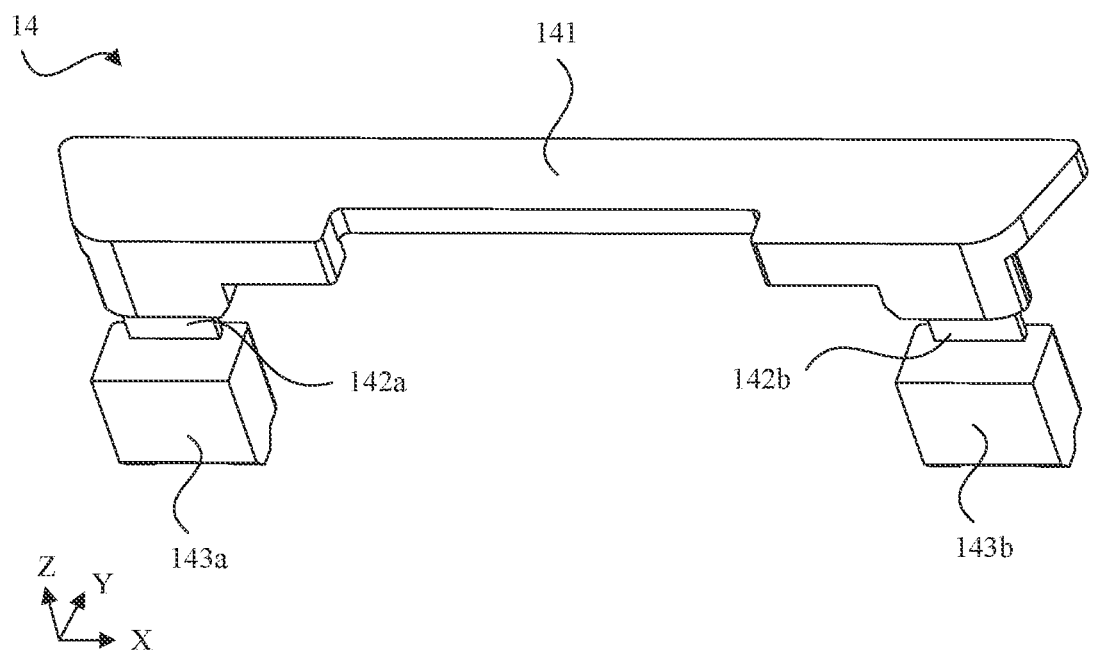
FIG. 9 is a schematic diagram of another structure of a protective bracket according to an embodiment of this application.
Figure 10:
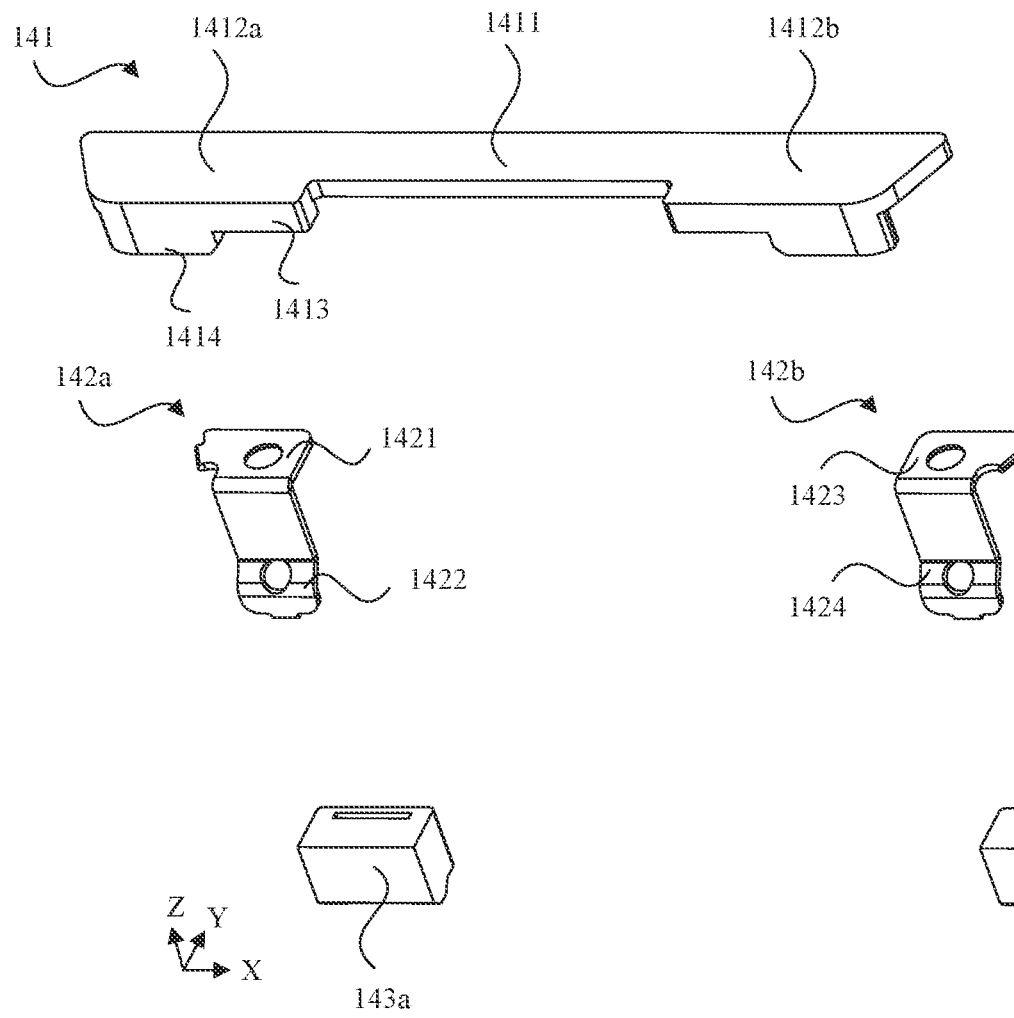
FIG. 10 is a schematic diagram of an exploded structure of the protective bracket provided in FIG. 9.

FIG. 9 is a schematic diagram of another structure of a protective bracket according to an embodiment of this application. FIG. 10 is a schematic diagram of an exploded structure of the protective bracket provided in FIG. 9. The protective bracket 14 includes a flexible part 141, a first metal part 142a, a second metal part 142b, a first rigid part 143a, and a second rigid part 143b. Structures of the flexible part 141, the first metal part 142a, and the second metal part 142b are the same as those in the embodiments corresponding to FIG. 9 and FIG. 10, and details are not described herein again. The first rigid part 143a is connected to an end that is of the first metal part 142a and that is away from the flexible part 141, and is fixedly connected in the first mounting groove 112a of the first main body 11a. The second rigid part 143b is connected to an end that is of the second metal part 142b and that is away from the flexible part 141, and is fixedly connected in the second mounting groove 112b of the second main body 11b.

The first rigid part 143a and the second rigid part 143b may be specifically block-shaped structures made of hard plastic. A partial length of the second connection plate 1422 of the first metal part 142a is embedded in the first rigid part 143a, and a partial length of the fourth connection plate 1424 of the second metal part 142b is embedded in the second rigid part 143b. The flexible part 141, the first metal part 142a, the second metal part 142b, the first rigid part 143a, and the second rigid part 143b are formed by using an in-mold injection molding process, so that the first connection plate 1421 of the first metal part 142a is embedded in the first connection segment 1412a of the flexible part 141, the second connection plate 1422 is embedded in the first rigid part 143a, the third connection plate 1423 of the second metal part 142b is embedded in the second connection segment 1412b of the flexible part 141, and the fourth connection plate 1424 is embedded in the second rigid part 143b, thereby forming an integrated protective bracket 14. The first rigid part 143a may be fastened in the first mounting groove 112a through clamping, bonding, or the like, and the second rigid part 143b may be fastened in the second mounting groove 112b through clamping, bonding, or the like.

In this embodiment, the first connection plate 1421 and the third connection plate 1423 are provided with openings, and the openings can improve strength of bonding between the first metal part 142a and the flexible part 141 and between the second metal part 142b and the flexible part 141. The second connection plate 1422 is also provided with an opening, and the opening can improve strength of bonding between the first metal part 142a and the first rigid part 143a. The fourth connection plate 1424 is also provided with an opening, and the opening can improve strength of bonding between the second metal part 142b and the second rigid part 143b.

Figure 11:
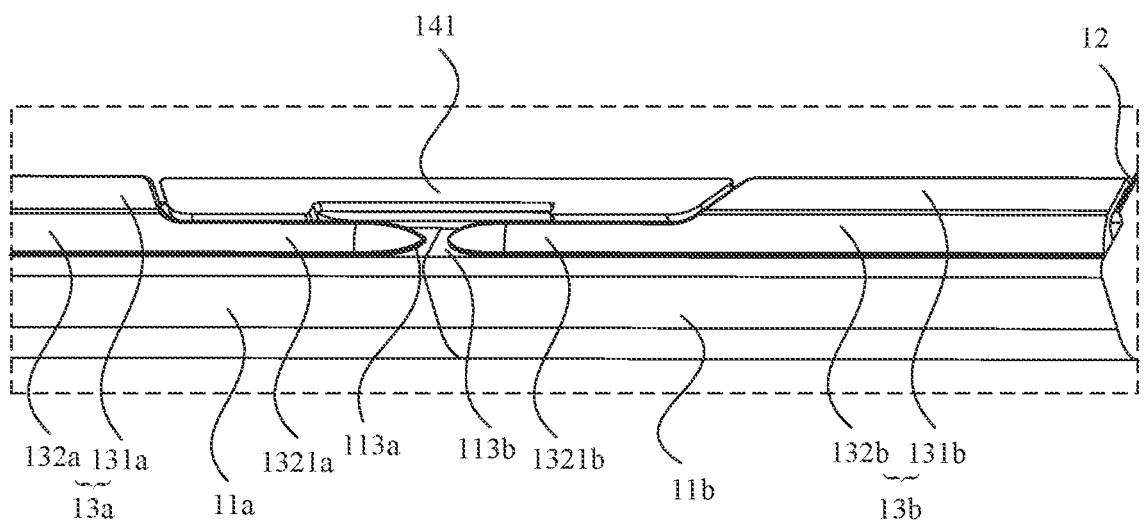
FIG. 11 is a schematic diagram of a mounting structure of a first protective strip and a second protective strip according to an embodiment of this application.

FIG. 11 is a schematic diagram of a mounting structure of a first protective strip and a second protective strip according to an embodiment of this application. As shown in FIG. 11, the first protective strip 13a includes a first planar-surface portion 131a and a first arc-surface portion 132a, and the second protective strip 13b includes a second planar-surface portion 131b and a second arc-surface portion 132b. The first planar-surface portion 131a and the first arc-surface portion 132a are integrally formed through injection molding and are respectively connected to the upper surface of the flexible screen 12 and the first stepped surface 113a. The second planar-surface portion 131b and the second arc-surface portion 132b are integrally formed through injection molding and are respectively connected to the upper surface of the flexible screen 12 and the second stepped surface 113b.

Specifically, the first planar-surface portion 131a and the second planar-surface portion 131b each have a long-strip-shaped structure, and surfaces of the first planar-surface portion 131a and the second planar-surface portion 131b are disposed as planes. The first planar-surface portion 131a and the second planar-surface portion 131b are respectively adhered to the first non-bending region 12a and the second non-bending region 12b. The first arc-surface portion 132a and the second arc-surface portion 132b each have a long-strip-shaped structure, and surfaces of the first arc-surface portion 132a and the second arc-surface portion 132b are disposed as arc-shaped surfaces. An end surface of the first arc-surface portion 132a is adhered to the first stepped surface 113a, and an outer surface of the first arc-surface portion 132a is in a smooth transition with the first planar-surface portion 131a. An end surface of the second arc-surface portion 132b is adhered to the second stepped surface 113b, and an outer surface of the second arc-surface portion 132b is in a smooth transition with the second planar-surface portion 131b. Only the first planar-surface portion 131a and the second planar-surface portion 131b are disposed protruding from the upper surface of the flexible screen 12, the first stepped surface 113a and the second stepped surface 113b are lower than the flexible screen 12, and the first arc-surface portion 132a and the second arc-surface portion 132b do not exceed the upper surface of the flexible screen 12. Therefore, the first arc-surface portion 132a and the second arc-surface portion 132b do not affect a thickness of the entire electronic device 100, and only thicknesses of the first planar-surface portion 131a and the second planar-surface portion 131b affect the thickness of the entire electronic device 100.

The first arc-surface portion 132a and the second arc-surface portion 132b respectively further include a first shielding segment 1321a and a second shielding segment 1321b. The first shielding segment 1321a can extend to a location that is on the first stepped surface 113a and that corresponds to the bending region 12c, and the second shielding segment 1321b can extend to a location that is on the second stepped surface 113b and that corresponds to the bending region 12c. In other words, the first shielding segment 1321a and the second shielding segment 1321b are disposed corresponding to the protective bracket 14, to play a shielding role, so that structures at locations at which the first mounting groove 112a, the second mounting groove 112b, and the protective bracket 14 are connected to the first main body 11a and the second main body 11b are not easily visible to a user's field of view. In addition, only the flexible part 141 of the protective bracket 14 is exposed to the outside, to improve an aesthetic property of appearance.

It should be noted that the first protective strip 13a and the second protective strip 13b have a same structure and are disposed symmetrically relative to the rotating shaft assembly 15. With reference to FIG. 2 and FIG. 4, it can be learned that there is a spacing between ends of the first shielding segment 1321a and the second shielding segment 1321b, and the spacing prevents the first protective strip 13a and the second protective strip 13b from affecting relative rotation of the first main body 11a and the second main body 11b.

In addition, the protective bracket 14 is connected inside the bezels of the first main body 11a and the second main body 11b through the first metal part 142a and the second metal part 142b, or through the first rigid part 143a and the second rigid part 143b. The first metal part 142a, the second metal part 142b, the first rigid part 143a, and the second rigid part 143b do not affect the thickness of the entire electronic device 100. The main body segment 1411, the first connection segment 1412a, and the second connection segment 1412b of the flexible part 141 are adhered to the upper surface of the flexible screen 12, so that only thicknesses of the main body segment 1411, the first connection segment 1412a, and the second connection segment 1412b of the flexible part 141 affect the thickness of the entire electronic device 100. A larger value in the thicknesses of the main body segment 1411, the first connection segment 1412a, and the second connection segment 1412b of the flexible part 141 of the protective bracket 14, and thicknesses of the first planar-surface portion 131a and the second planar-surface portion 131b of the first protective strip 13a and the second protective strip 13b determines the thickness of the entire electronic device 100. In a possible implementation, the thicknesses of the main body segment 1411, the first connection segment 1412a, and the second connection segment 1412b of the flexible part 141 of the protective bracket 14 are the same as the thicknesses of the first planar-surface portion 131a and the second planar-surface portion 131b of the first protective strip 13a and the second protective strip 13b.

A process of assembling the foldable electronic device 100 provided in the embodiments of this application may include the following steps.

Figure 12:
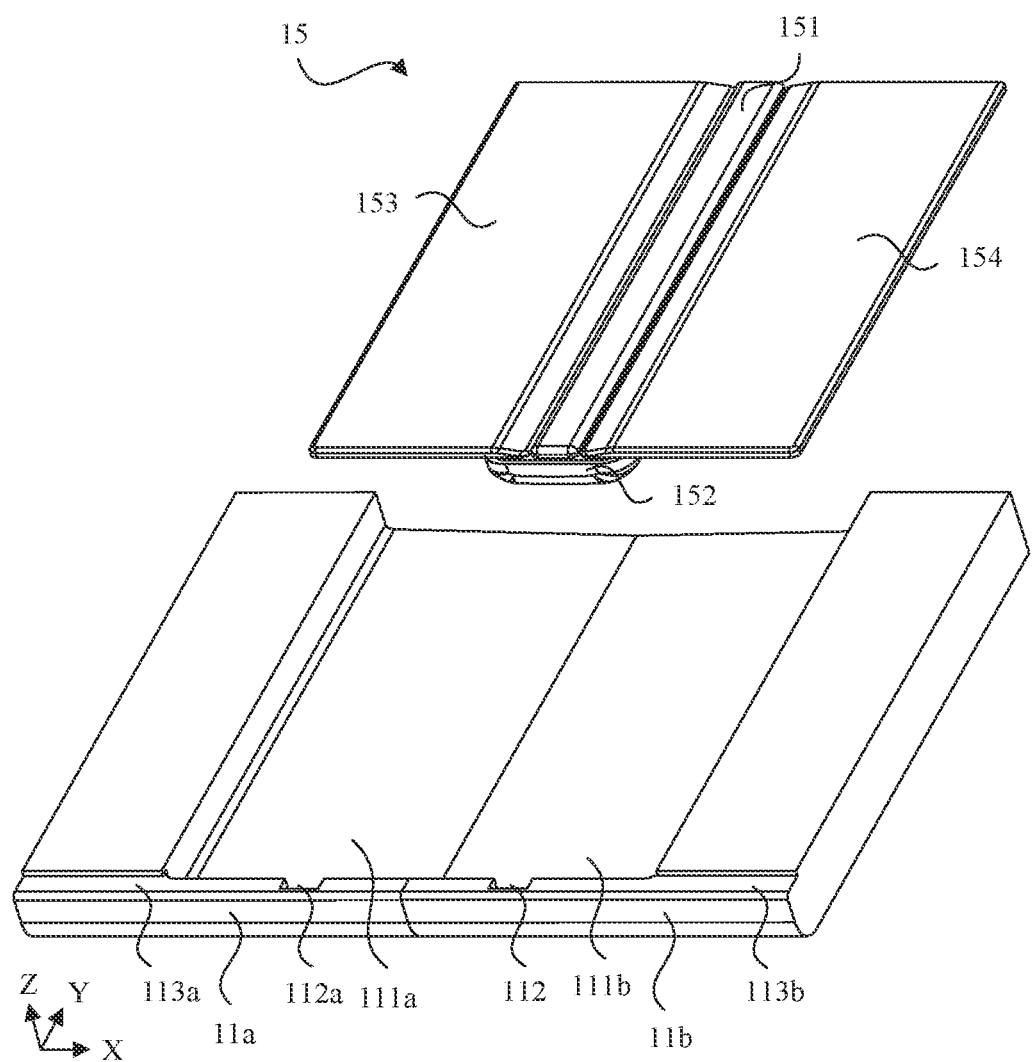
FIG. 12 is a schematic diagram of a process of assembling a first main body, a second main body, and a rotating shaft assembly of a foldable electronic device according to an embodiment of this application.

FIG. 12 is a schematic diagram of a process of assembling a first main body, a second main body, and a rotating shaft assembly of a foldable electronic device according to an embodiment of this application. As shown in FIG. 12, first, the rotating shaft housing 152 is sleeved outside the rotating shaft body 151, and the rotating shaft assembly 15 is mounted in the first accommodating cavity 111a and the second accommodating cavity 111b of the first main body 11a and the second main body 11b. In addition, the first mechanical part 153 and the first main body 11a, and the second mechanical part 154 and the second main body 11b are respectively fixedly connected. Upper surfaces of the first mechanical part 153, the second mechanical part 154, the rotating shaft body 151, the first main body 11a, and the second main body 11b are enabled to be located on a same plane.

Figure 13:
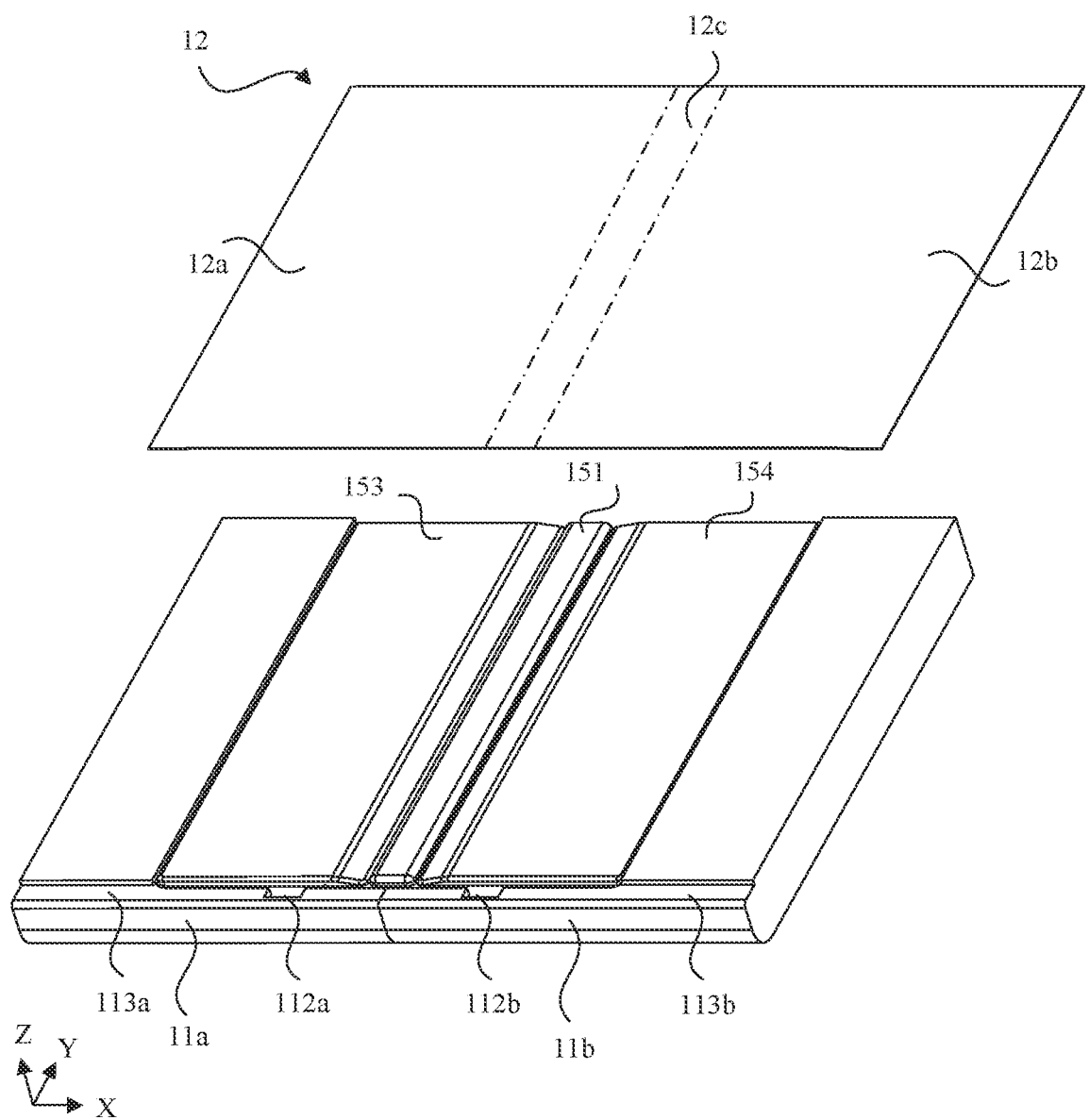
FIG. 13 is a schematic diagram of a process of assembling a first main body, a second main body, a rotating shaft assembly, and a flexible screen of a foldable electronic device according to an embodiment of this application.

FIG. 13 is a schematic diagram of a process of assembling a first main body, a second main body, a rotating shaft assembly, and a flexible screen of a foldable electronic device according to an embodiment of this application. As shown in FIG. 13, the flexible screen 12 is adhered to upper surfaces of the first main body 11a, the second main body 11b, the first mechanical part 153, the second mechanical part 154, and the rotating shaft body 151.

Figure 14:
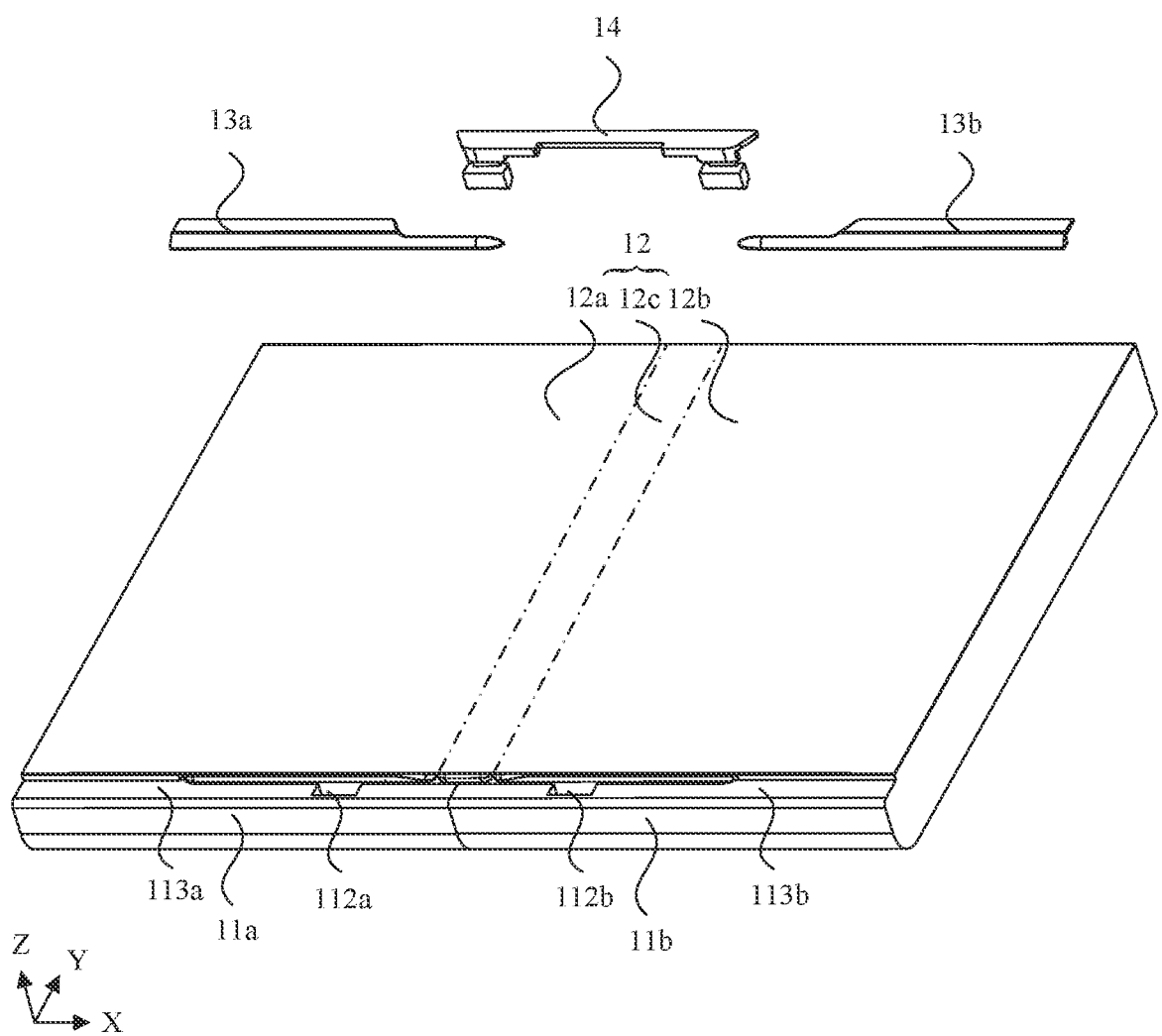
FIG. 14 is a schematic diagram of a process of assembling a first protective strip, a second protective strip, and a protective bracket of a foldable electronic device according to an embodiment of this application.

FIG. 14 is a schematic diagram of a process of assembling a first protective strip, a second protective strip, and a protective bracket of a foldable electronic device according to an embodiment of this application. As shown in FIG. 14, the first metal part 142a and the second metal part 142b or the first rigid part 143a and the second rigid part 143b at the two ends of the protective bracket 14 are respectively mounted in the first mounting groove 112a and the second mounting groove 112b of the first main body 11a and the second main body 11b. Further, the first protective strip 13a and the second protective strip 13b are respectively connected to the first main body 11a and the second main body 11b, so that the first planar-surface portion 131a and the second planar-surface portion 131b are respectively adhered to the first non-bending region 12a and the second non-bending region 12b of the flexible screen 12, and the end surfaces of the first arc-surface portion 132a and the second arc-surface portion 132b are respectively adhered to the first stepped surface 113a and the second stepped surface 113b.

According to the foldable electronic device provided in the embodiments of this application, a protective bracket for protecting a bending region of a flexible screen is provided, and the protective bracket includes a flexible part and a metal part. The flexible part is connected in the bending region of the flexible screen and can be bent along with bending of the flexible screen, to protect the flexible screen. Two ends of the flexible part are respectively fixedly connected to a first main body and a second main body through the metal part, and a part of the metal part is embedded in the flexible part, so that a thickness of the flexible part is relatively small while structural strength of the protective bracket can be improved, thereby facilitating a light and thin design of the entire foldable electronic device.

Finally, it should be noted that the foregoing embodiments are merely intended for describing the technical solutions of the embodiments of this application, rather than limiting the embodiments of this application. Although the embodiments of this application is described in detail with reference to the foregoing embodiments, a person of ordinary skill in the art should understand that modifications may still be made to the technical solutions described in the foregoing embodiments or equivalent replacements may still be made to some or all technical features thereof, without departing from the scope of the technical solutions of the embodiments of this application.

What is claimed is:

1. A foldable electronic device comprising:
   a first main body comprising a first bezel, wherein the first bezel comprises a first mounting groove;

a rotating shaft assembly;
a second main body coupled to the first main body using the rotating shaft assembly and comprising a second bezel, wherein the second bezel comprises a second mounting groove;
a flexible screen disposed on the first main body and the second main body and comprising:
a bending region comprising:
a first side; and
a second side;
a first non-bending region located on the first side; and
a second non-bending region located on the second side;
a third side comprising the flexible screen,
wherein the first main body and the second main body are configured to rotate relative to the rotating shaft assembly toward the third side; and
a protective bracket comprising:
a first rigid part adhered in the first mounting groove;
a second rigid part adhered in the second mounting groove;
a flexible part disposed on the flexible screen and comprising:
a main body segment corresponding to the bending region;
a first connection segment corresponding to the first non-bending region; and
a second connection segment corresponding to the second non-bending region;
a first metal part comprising:
a first end embedded in the first connection segment; and
a second end fixedly coupled to the first bezel; and
a second metal part comprising:
a third end embedded in the second connection segment; and
a fourth end fixedly coupled to the second bezel.

2. The foldable electronic device of claim 1, wherein the first metal part further comprises:
a first metal sheet embedded in the first connection segment; and
a second metal sheet disposed at a first included angle with the first metal sheet, wherein the second metal sheet extends into and is fastened in the first mounting groove,
wherein the second metal part further comprises:
a third metal sheet embedded in the second connection segment; and
a fourth metal sheet disposed at a second included angle with the third metal sheet, wherein the fourth metal sheet extends into and is fastened in the second mounting groove.

3. The foldable electronic device of claim 2, wherein the second metal sheet comprises a fifth end located away from the first metal sheet and embedded in the first rigid part, and wherein the fourth metal sheet comprises a sixth end located away from the third metal sheet and embedded in the second rigid part.

4. The foldable electronic device of claim 1, wherein the rotating shaft assembly comprises a fifth end and a sixth end, wherein the foldable electronic device further comprises:
a first protective bracket disposed at the fifth end; and
a second protective bracket disposed at the sixth end.

5. The foldable electronic device of claim 1, wherein the flexible part is a soft rubber strip, and wherein the first metal part and the second metal part are stainless steel metal sheets.

6. The foldable electronic device of claim 5, wherein the protective bracket is configured to integrally form through in-mold injection molding.

7. The foldable electronic device of claim 1, wherein the flexible screen comprises an edge, wherein the edge comprises a non-display region, and wherein the flexible part is disposed in the non-display region.

8. The foldable electronic device of claim 1, wherein each of the main body segment, the first connection segment, and the second connection segment have a thickness of 0.3 millimeters (mm) to 0.5 mm.

9. The foldable electronic device of claim 1, further comprising:
a first protective strip adhered in the first non-bending region and fixedly coupled to the first bezel; and
a second protective strip adhered in the second non-bending region and fixedly coupled to the second bezel.

10. The foldable electronic device of claim 9, wherein the first main body comprises a first upper surface, wherein the second main body comprises a second upper surface, wherein the first bezel comprises a first stepped surface that is lower than the first upper surface, wherein the second bezel comprises a second stepped surface that is lower than the second upper surface, and wherein the flexible screen is adhered to the first upper surface and the second upper surface.

11. The foldable electronic device of claim 10, wherein the first arc-surface portion comprises a first shielding segment, wherein the second arc-surface portion comprises a second shielding segment, and wherein the first shielding segment and the second shielding segment are opposite to the flexible part in length directions of the first stepped surface and the second stepped surface.

12. The foldable electronic device of claim 9, wherein the first protective strip and the second protective strip are integrally formed hard plastic members.

13. The foldable electronic device of claim 1, wherein the first main body comprises a first accommodating cavity and a first upper surface, wherein the second main body comprises a second accommodating cavity and a second upper surface, and wherein the rotating shaft assembly is disposed in the first accommodating cavity and the second accommodating cavity.

14. The foldable electronic device of claim 13, wherein the rotating shaft assembly comprises:
a rotating shaft body;
a rotating shaft housing;
a first mechanical part configured to rotate relative to the rotating shaft body, fixedly coupled to the first main body, and comprising a third upper surface; and
a second mechanical part coupled to the first mechanical part through the rotating shaft body, wherein the second mechanical part is configured to rotate relative to the rotating shaft body, is fixedly coupled to the second main body, and comprises a fourth upper surface,
wherein when the foldable electronic device is in an unfolded state, the first upper surface, the second upper surface, the third upper surface, and the fourth upper surface are located on a same plane.

15. The foldable electronic device of claim 13, wherein the rotating shaft body further comprises a fourth side located away from the flexible screen, and wherein the rotating shaft housing is configured to sleeve on the fourth side.

16. The foldable electronic device of claim 10, wherein the first protective strip comprises:

a first planar-surface portion adhered in the first non-bending region; and a first arc-surface portion adhered on the first stepped surface, and wherein the second protective strip comprises:

a second planar-surface portion adhered in the second non-bending region; and a second arc-surface portion adhered on the second stepped surface.

17. The foldable electronic device of claim 10, wherein the first bezel comprises a fourth side, wherein the second bezel comprises a fifth side, wherein the first stepped surface is located on the fourth side, and wherein the second stepped surface is located on the fifth side.

18. The foldable electronic device of claim 9, wherein the flexible screen comprises:

a display region; and a non-display region located around the display region.

19. The foldable electronic device of claim 18, wherein the first protective strip, the second protective strip, and the protective bracket are coupled to the non-display region.

20. The foldable electronic device of claim 1, wherein the flexible screen is an organic light-emitting diode (OLED) display screen, and wherein the OLED display screen comprises:

a substrate base plate;

a display panel;

a polarizing plate;

a cover plate; and an optically clear adhesive.

* * * * *